(12) United States Patent
Morikawa et al.

(10) Patent No.: US 8,732,622 B2
(45) Date of Patent: May 20, 2014

(54) INPUT APPARATUS AND DISPLAY CONTROL APPARATUS

(71) Applicant: Denso Corporation, Kariya (JP)

(72) Inventors: Shohei Morikawa, Ichinomiya (JP); Takeshi Kawashima, Nisshin (JP); Hirotaka Goto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/647,605

(22) Filed: Oct. 9, 2012

(65) Prior Publication Data

US 2013/0097564 A1 Apr. 18, 2013

(30) Foreign Application Priority Data

Oct. 17, 2011 (JP) ................................. 2011-227702

(51) Int. Cl.
*G06F 15/00* (2006.01)
*G06F 13/00* (2006.01)

(52) U.S. Cl.
USPC .......................................... 715/861; 715/863

(58) Field of Classification Search
USPC .......... 715/861–863, 856, 273, 716, 763–764
See application file for complete search history.

(56) References Cited

U.S. PATENT DOCUMENTS

| 2007/0013659 | A1 | 1/2007 | Nagata et al. | |
| 2007/0109284 | A1* | 5/2007 | Yamazaki et al. | 345/204 |
| 2010/0199208 | A1 | 8/2010 | Tokunaga et al. | |
| 2011/0131494 | A1* | 6/2011 | Ono et al. | 715/716 |

FOREIGN PATENT DOCUMENTS

| JP | A-2006-244393 | 9/2006 |
| JP | 2007-241342 A | 9/2007 |
| JP | A-2010-282244 | 12/2010 |

OTHER PUBLICATIONS

Office Action mailed Sep. 3, 2013 in corresponding JP Application No. 2011-227702 (and English translation).

\* cited by examiner

*Primary Examiner* — Cao "Kevin" Nguyen

(57) ABSTRACT

In an input apparatus, a display portion displays a plurality of function items on a screen to form a plurality of rows that are parallel in a predetermined row direction. The function items are provided with selection regions, respectively. One of the selection regions is selected, using a pointer according to a predetermined selection manipulation, and is determined according to a predetermined determination manipulation. When a first function item in a first row of the plurality of rows is selected, a selection region of the first row is enlarged in a direction directing at a row next to the first row.

5 Claims, 5 Drawing Sheets

INPUT APPARATUS AND DISPLAY CONTROL APPARATUS

CROSS REFERENCE TO RELATED APPLICATION

This application is based on Japanese Patent Application No. 2011-227702 filed on Oct. 17, 2011 the disclosure of which is incorporated herein by reference.

TECHNICAL FIELD

The present disclosure relates to an input apparatus and display control apparatus to select one of function items such as buttons or icons, which are displayed, by a predetermined selection manipulation, and determine the selected one of the function items based on a predetermined determination manipulation.

BACKGROUND ART

[Patent document 1] JP 2010-282244 A

A conventional input apparatus is indicated in Patent document 1, for instance. The input apparatus in Patent document 1 includes the following: a display portion which displays function items as objects and a cursor on the screen; an input portion which selects a function item using the cursor; and a control portion which controls a movement of the cursor based on an input value from the input portion.

The cursor may be moved from the position of a function item to a position outside of the function item. In this case, the control portion stops the cursor once on a boundary of the function item, and then moves the cursor towards the position outside of the function item when a magnitude of an input value for the movement of the cursor is greater than a threshold value.

Such a configuration enables ignorance of an unintended slight misalignment arising in the case of manipulating the input portion when shifting the cursor to a position outside of the function item. Thus, the selection of an intended function item is facilitated; the higher-precision manipulation is enabled.

The display portion may contain several function items that are arrayed as several rows. Such a configuration may cause an erroneous selection of a function item. The manipulation by the input portion is a manual manipulation of a person. When moving a cursor in a row direction in which the row of function items is extended, the input portion may not easily move the cursor to perfectly follow the straight line along the row direction. The cursor may be sometimes moved to a row next to the row to which an intended function item belongs; thereby, an unintended function item in the next row may be selected unfortunately.

Further, even if an intended function item is correctly selected, the selected coordinate position may be close to the boundary of the intended function item; further, a slight misalignment may occur in an input manipulation for determining the selection such as a manipulation of pressing with a finger. This may cause an erroneous input to unintentionally determine the selection of an unintended function item belonging to the next row.

SUMMARY

It is an object of the present disclosure to provide an input apparatus and a display control apparatus to help prevent erroneous selection or erroneous input of function items that are arranged in at least one row.

To achieve the above object, according to a first example of the present disclosure, an input apparatus is provided to include a display portion, an input portion, and a control portion. The display portion displays a plurality of function items on a screen. The input portion inputs an input value to move a pointer that conducts a movement to move on the screen, performs a selection to select one of a plurality of selection regions that are provided to the plurality of function items, respectively, using the pointer according to a predetermined selection manipulation, and determines the selection according to a predetermined determination manipulation. The control portion controls the movement of the pointer based on the input value from the input portion. Herein, the plurality of function items are arranged to form at least one row in a predetermined row direction. When a first function item of the plurality of function items is selected, the first function item being contained in a first row that is one of the at least one row arranged in the predetermined row direction, the control portion performs an enlargement to enlarge a selection region of the first row containing the first function item in a direction, which is orthogonal to the predetermined row direction and directing outward of the first row.

Such a configuration of the first example may provide the following. A target is a row of function items containing an arbitrary selected function item; the row of function items are aligned to be extended in a predetermined row direction. The row of the function items is provided with a selection region having a boundary line. The position of the boundary line is shifted towards and into the next row, if present, so as to enlarge the selection region. A misalignment deviating towards the next row may occur when the pointer is moved from an arbitrary function item. Even in such a case, the misalignment may be absorbed, helping prevent an erroneous selection of an unintended function item.

In addition, assume that the pointer may be moved from an arbitrary function item so as to select an intended function item, whereas the position of the pointer may be near the boundary of the function item, the boundary which exists in between two adjacent rows of function items, if present. Even in such a case, the above featured configuration enlarges the selection region in the direction directing at the next row, therefore enabling absorption of the misalignment that may occur in determining the selection. Thus, after selecting an intended function item, the intended function item may be determined certainly, suppressing an erroneous input.

According to a second example of the present disclosure, an input apparatus is provided to include a display portion, an input portion, and a control portion. The display portion displays a plurality of function items on a screen. The input portion inputs an input value to move a pointer that conducts a movement of a pointer on the screen, performs a selection to select one of a plurality of selection regions provided to the plurality of function items, respectively, using the pointer according to a predetermined selection manipulation, and determines the selection according to a predetermined determination manipulation. The control portion controls the movement of the pointer based on the input value from the input portion. Herein, the function items are arranged to form a plurality of rows parallel in a predetermined row direction. When the pointer is moved from a selection region of a first function item that is selected as a present selected function item, the control portion calculates coordinate distances between the pointer and each of neighboring function items contained in the first row and a second row that is next to the first row, calculates an amended distance that is obtained by subtracting by a predetermined amendment quantity from only the coordinate distances between the pointer and each of the neighboring function items contained in the first row, and selects as a next selected function item a function item that has a shortest distance among the coordinate distances and the amended distances.

Under the above configuration, a distance between the pointer and a function item is calculated depending on which row the function item belongs to. That is, if an arbitrary function item belongs to a row where the pointer was located before moving, an amended distance is calculated by shortening the coordinate or actual distance. The next selected function item is selected which has the shortest or smallest value among the coordinate distances and the amended distances. Thus, the priority of the selection may be given to the function items belonging to same the row as the row where the pointer was located before moving, i.e., given to the function items that are located in the predetermined row direction from the present selected function item. Therefore, the function items belonging to same the row as the row where the pointer was located before moving may be easily selected or determined as the next selected function item. As a result, an erroneous selection or erroneous input may be suppressed.

According to a third example of the present disclosure, an input apparatus is provided as follows. The apparatus selects one of a plurality of buttons displayed on a screen provided with a plurality of pixels in a vehicle. The input apparatus includes a manipulation portion and a control portion. The manipulation portion is configured to point out a spot on the screen according to a manipulation of an occupant of the vehicle. The control portion displays the buttons to be arranged in at least one direction of (i) a longitudinal direction and (ii) a lateral direction on the screen and to specify a selectable pixel region provided to each of the buttons. When the manipulation portion points out a selectable pixel region of one of the buttons, the control portion performs an enlargement to enlarge the selectable pixel region of the one of the buttons, and performs an enlargement to enlarge, in an other direction, a selectable pixel region of a next button that is next to the one of the buttons in the at least one direction. Herein, the other direction is an other of the longitudinal direction of the lateral direction other than the at least one direction.

According to a fourth example of the present disclosure, a display control apparatus is provided while cooperating with a display portion displaying a plurality of buttons and an input portion inputting an input value. The display control apparatus includes the following sections. A button display section is included to cause the display portion to display the plurality of buttons as being arranged to form at least one row in a predetermined row direction. A selection region setup section is included to set up a plurality of selection regions that are provided to the plurality of buttons on the display portion, respectively. An input value processing section is included to process the input value inputted by the input portion to identify a pointed point on the display portion. A button identification section is included to identify one of the buttons when the pointed point is located within a selection region of the one of the buttons in the at least one row. A selection region enlargement section is included to enlarge the selection region of the one of the buttons identified by the button identification section, to a direction that is orthogonal to the predetermined row direction. The section region enlargement section further enlarges, in addition to the selection region of the one of the buttons identified by the button identification section, at least one selection region of at least one button that is included in a same row that is same as the at least one row including the one of the buttons identified by the button identification section.

Further, according to other examples of the present disclosure, display control apparatuses are provided to basically achieve the control portions and part of the input portions in the input apparatuses according to the above first to third examples while each cooperating with the display portion and the input portion.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following explains several embodiments with reference to the drawings. Each embodiment may have a portion corresponding to that of a precedent embodiment; such a portion is assigned with an identical reference number so as to omit overlapped explanation. When only a portion of the configuration of each embodiment is explained, the other portions of the configuration may adopt those of the precedent embodiment previously explained. Partial combination between the embodiments may be possible with respect to not only a portion which is explicitly described in each embodiment, but also a portion which is not explicitly described if any trouble does not arise.

(First Embodiment)

Figure 1:
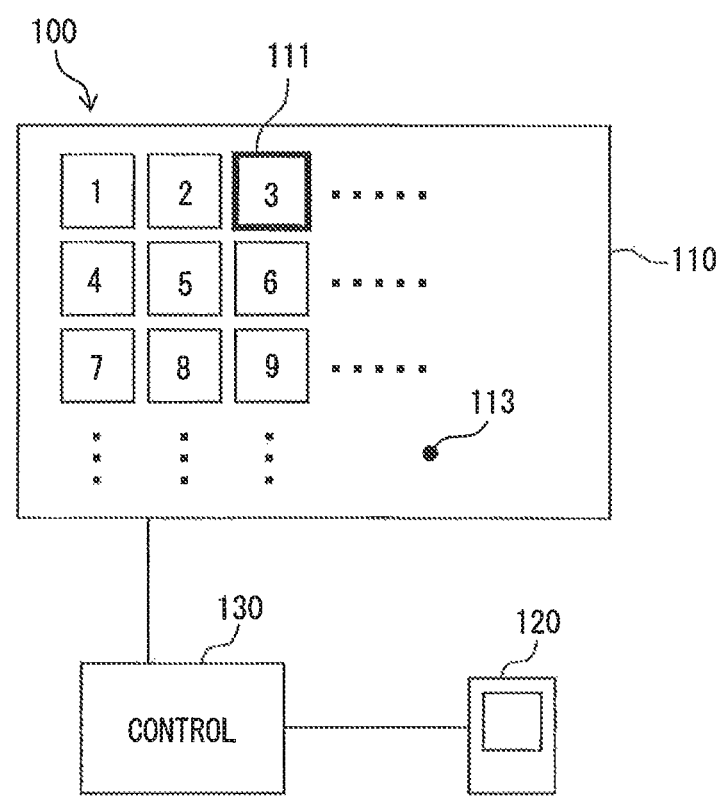
FIG. 1 is a diagram illustrating a schematic configuration of an input apparatus according to embodiments of the present disclosure.
Figure 2:
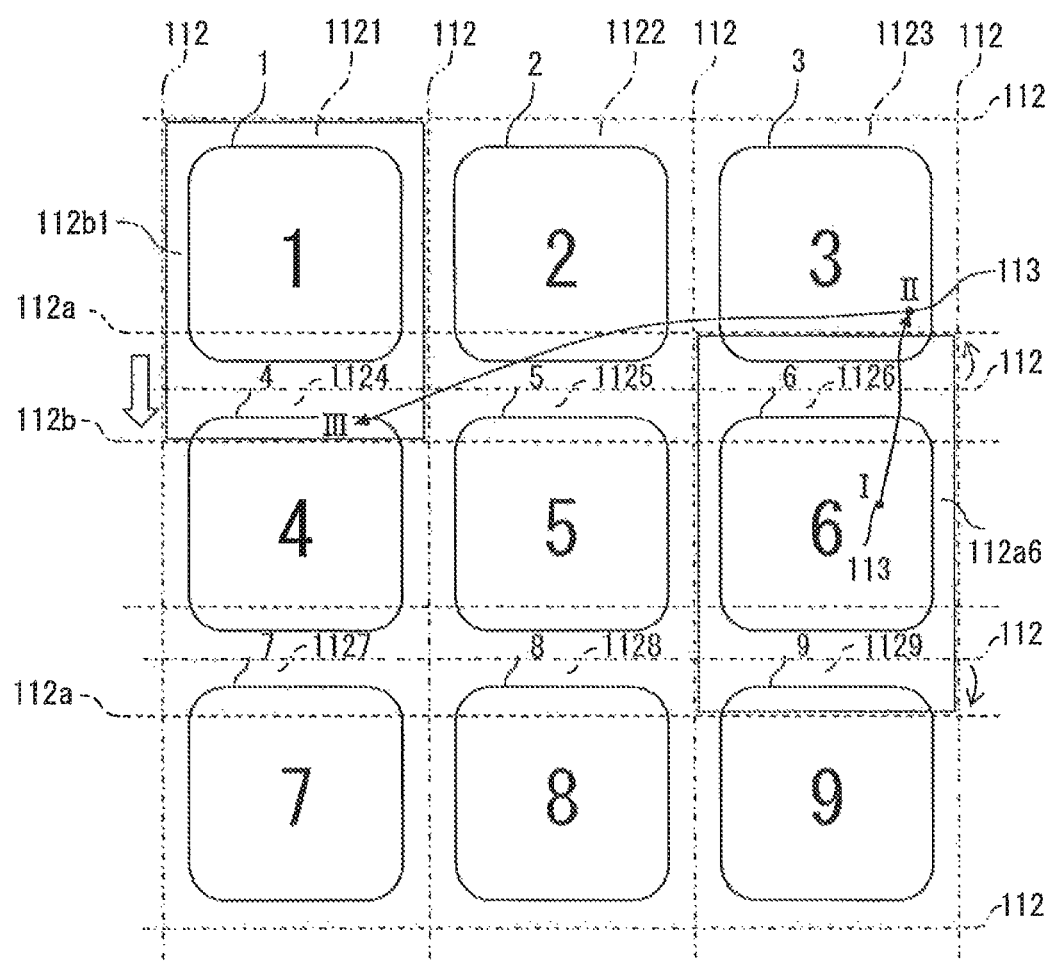
FIG. 2 is a diagram for explaining a selection region and an enlarged selection region of a button according to the first embodiment.

The following will explain an input apparatus 100 according to a first embodiment of the present disclosure with reference to FIG. 1 and FIG. 2. FIG. 1 illustrates a schematic configuration of the input apparatus 100; FIG. 2 explains selection regions 1121 to 1129 of buttons 1 to 9 and enlarged selection regions 112a6, 112b1 of the buttons 1 to 9.

The input apparatus 100 includes the following: a display portion 110 which displays a GUI (graphical user interface) in a screen; an input portion 120 which inputs or enters instructions to a system; and a control portion 130 which performs a display control of the GUI based on an input from the input portion 120.

The display portion 110 is a display device or means such as a liquid crystal display, for example, and displays a plurality of function items over a whole of the screen, for instance. The function items may be buttons or icons, for example, and the plurality of buttons are arranged to form several rows (also referred to as strings) on the screen. In the present embodiment, the buttons are arrayed to align in the lateral direction (i.e., left-right direction or horizontal direction) and the longitudinal direction (i.e., top-bottom direction, or vertical direction), respectively, so that a grid pattern or rectangular arrangement is formed to contain a plurality of longitudinal rows of buttons or function items and a plurality of lateral rows of buttons or function items. FIG. 1 and FIG. 2 illustrates only nine buttons 1 to 9 just for explanation. The buttons 1 to 9 are assigned or associated with predetermined programs, respectively. An arbitrary button may be selected by a selection manipulation and then determined by a determination manipulation, thereby executing the program associated with the arbitrary button. The detail will be explained later.

The arrangement of the buttons may be not limited to such a grid pattern. For instance, the sizes of the buttons may be different; for instance, a button aligned in a middle of the row may have a size either larger or smaller than other neighboring or surrounding buttons. Alternatively, no button may be allocated in a middle of the row. FIGS. 1, 2 illustrate the buttons 1 to 9 having an outer shape (i.e., peripheral shape) of approximately rectangle or square with corners rounded off. The outer shape of the button may be not limited thereto.

When one of the buttons is selected among the buttons 1 to 9, a cursor 111 shaped of a frame is displayed to light up in an outer peripheral part of the selected button 9 (refer to the button 3 in FIG. 1). This enables a user to notice visually that the button 9 is in a selected state.

Further, as illustrated in FIG. 2, the buttons 1 to 9 are assigned with selection regions 1121 to 1129, respectively. The selection regions 1121 to 1129 containing the buttons 1 to 9, respectively, are defined by boundary lines 112 that intervene in intermediate positions which equally divide areas in between the buttons 1 to 9, respectively. That is, in an initial or default operation state of the input apparatus 100, each selection region 1121 to 1129 is provided to surround an outer periphery of each button 1 to 9 without entering the next button. The boundary lines 112 are designed on the screen of the display portion 110 to be invisible for users.

The input portion 120 is an input device or means to include a pointing device such as a track-pad or a touchpad. The input portion 120 receives a slide manipulation by a user to slide a finger on a surface of the input portion 120, and thereby moves a pointer 113 on the screen of the display portion 110. The pointer 113 may be designed to be either visible or invisible for a user. When the pointer 113 enters a selection region 1121 to 1129 of a desired or intended button 1 to 9 out of the buttons 1 to 9, the desired button 1 to 9 is enabled to be in a selected state. Furthermore, the selected state of the desired button 1 to 9 may be switched into a determined state when the input portion 120 receives a predetermined determination manipulation by a user to press a surface of the input portion 120 with a finger, for instance.

The control portion 130 is, for instance, a computer containing a central processing unit (CPU), a primary storage unit (memory), and an auxiliary storage unit. The CPU has functions of at least computation and control. The primary storage unit includes ROM and RAM to store programs and data. The auxiliary storage unit includes a hard disk drive (HDD). The control portion 130 controls the movement of the pointer 113 based on an input value (i.e., a magnitude of slide of a finger) from the input portion 120. The control portion 130 further performs an overall display control of the input apparatus 100 by including several sections to individually achieve featured configurations which will be explained below.

Furthermore, the input portion 120 may be configured to only receive an input value or a manipulation by a user and transmit the received input value or a signal in response to the manipulation to the control portion 130. In this case, the control portion 130 may function as a function item display section or button display section to cause the display portion 110 to display the plurality of function items on the screen; a selection region setup section to set up a plurality of selection regions that are provided to the plurality of function items on the screen of the display portion 110, respectively; an input value processing section to process the input value inputted by the input portion 120 to identify a pointed point on the display portion or move the pointer 113 that conducts a movement to move on the screen; a selection section to select one of the plurality of selection regions that are provided to the plurality of function items, respectively, based on the movement of the pointer; and a button identification section to identify a button when a pointed point identified is located within a selection region of the button.

The present embodiment has a featured configuration as follows. As explained above, the buttons 1 to 9 are arranged to form (i) a plurality of lateral button rows that extend in the lateral direction and (ii) a plurality of longitudinal button rows that extend in the longitudinal direction. For instance, one example of the lateral button row is formed by the buttons 1, 2, 3; one example of the longitudinal button row is formed by the buttons 1, 4, 7 in FIG. 1.

Suppose that one of the lateral direction and the longitudinal direction is defined as being a predetermined row direction (also referred to as a main movement direction).

Further, suppose that when an arbitrary button is selected out of the buttons 1 to 9, the button row containing the selected arbitrary button and extending in the predetermined row direction is defined as a designated button row. Now, when the arbitrary button is selected, each of two both-sides boundary lines 112 of the designated button row is moved to a position or line 112a, 112b in a direction directing at a row next to the designated button row, thereby performing a re-configuration to enlarge a selection region of the designated button row.

It is noted that the predetermined row direction or main movement direction may be defined as, of the pointer 113, a usable movement direction that facilitates a user to select a desired button by moving the pointer 113 from viewpoints of contents and arrangement of the buttons 1 to 9. In the present embodiment, the predetermined row direction or main movement direction is regarded as the lateral direction, for example.

In specific, as indicated in FIG. 2, the pointer 113 is supposed to be located at a position I in the button 6 at the present time. Since the pointer 113 is within the selection region 1126 containing the region of the button 6, the button 6 is in the selected state, among the buttons 1 to 9. Since the button 6 is in the selected state at this time, the control portion 130 configures or specifies enlarged boundary lines 112a as new boundary lines for the lateral button row containing the buttons 4 to 6. Out of the boundary lines 112 in the lateral direction in FIG. 2, the second and third boundary lines 112 are moved towards and into a next lateral button row containing the buttons 1, 2, 3 and a next lateral button row by a predetermined magnitude, respectively, and enter both the lateral button rows, thereby preparing the new enlarged boundary lines 112a to enlarge the selection region of the lateral button row containing the buttons 4, 5, 6. Thus, the button 6 is assigned with an enlarged selection region 112a6 (solid-lined rectangle region in FIG. 2) which encloses the button 6 with the enlarged boundary lines 112a. It is noted that as explained above, the control portion 130 may function as a selection region enlargement section.

The following will explain the next state subsequent to the above state. Suppose that the user moves the pointer 113 to the position II in the button 3 from the position I in the button 6. Since the pointer 113 exceeds the enlarged boundary line 112a that is positioned within the button 3, the button 3 becomes newly in the selected state.

Furthermore, when the button 3 is now in the selected state, the control portion 130 resets the enlarged boundary lines so as to change from the enlarged boundary line 112a into the enlarged boundary line 112b, as illustrated in a white arrow in FIG. 2. The position of the enlarged boundary line 112b is a position that is reached after the movement by the predetermined magnitude into the button row containing the buttons 4, 5, 6 that is next to the row containing the button 3.

Thereby, the selection regions 1121 to 1123 of the buttons 1 to 3 are extended downwards in the longitudinal direction. For example, the selection region 1121 (dashed-line rectangle area in FIG. 2) of the button 1 turns into the enlarged selection region 112b1 (solid-lined rectangle area in FIG. 2).

After the button 3 is selected by the pointer 113 that was moved to the position II in FIG. 2, the pointer 113 may be moved in the main movement direction (lateral direction in FIG. 2) by the user. At this time, the pointer 113 may cause a mis-alignment toward the next button row containing the buttons 4 to 6 depending on the sliding manipulation of the user's finger in the input portion 120. This is because the sliding manipulation of the finger by the user is just a manual movement to thereby make the perfect linear movement of the sliding manipulation more difficult.

The present embodiment can provide an advantage as follows. Now the buttons 1 to 3 are estimated to be located in the movement direction of the pointer 113; the selection regions 1121, 1122, 1123 of the buttons 1 to 3 are enlarged toward and into the next button row containing the buttons 4 to 6. Even if the movement of the pointer 113 exhibits a mis-alignment, the misalignment by the pointer 113 may be absorbed, helping prevent an occurrence of an erroneous selection of an unintended button. For example, with reference to FIG. 2, suppose that the pointer 113 is newly moved to the position III on the button 4. If the usual selection regions 1121 to 1129 are still valid, the button 4 should be selected. However, the enlarged selection region 112b1 is presently valid based on the boundary line 112b; therefore, the button 1 is selected.

In addition, suppose that the pointer 113 is moved and a desired button is thereby selected whereas the pointer's position on the desired button is close to the boundary line against the next button row. Even in such cases, the selection region is enlarged, as the enlarged selection region, in the direction directing at the next button row, therefore enabling absorption of the misalignment that may occur in determining the selection. The selected desired button can be thus certainly determined, suppressing an erroneous input.

Further, with reference to FIG. 2, suppose that the pointer 113 is moved in the button 4 from the button 3 via the button 6. In this case, the enlarged boundary lines 112a become valid. Even if the pointer 113 causes a misalignment to deviate from the button row containing the buttons 4, 5, 6 towards the button row containing the button 1, the button 4 is enabled to be selected.

(Modification of First Embodiment)

Figure 3:
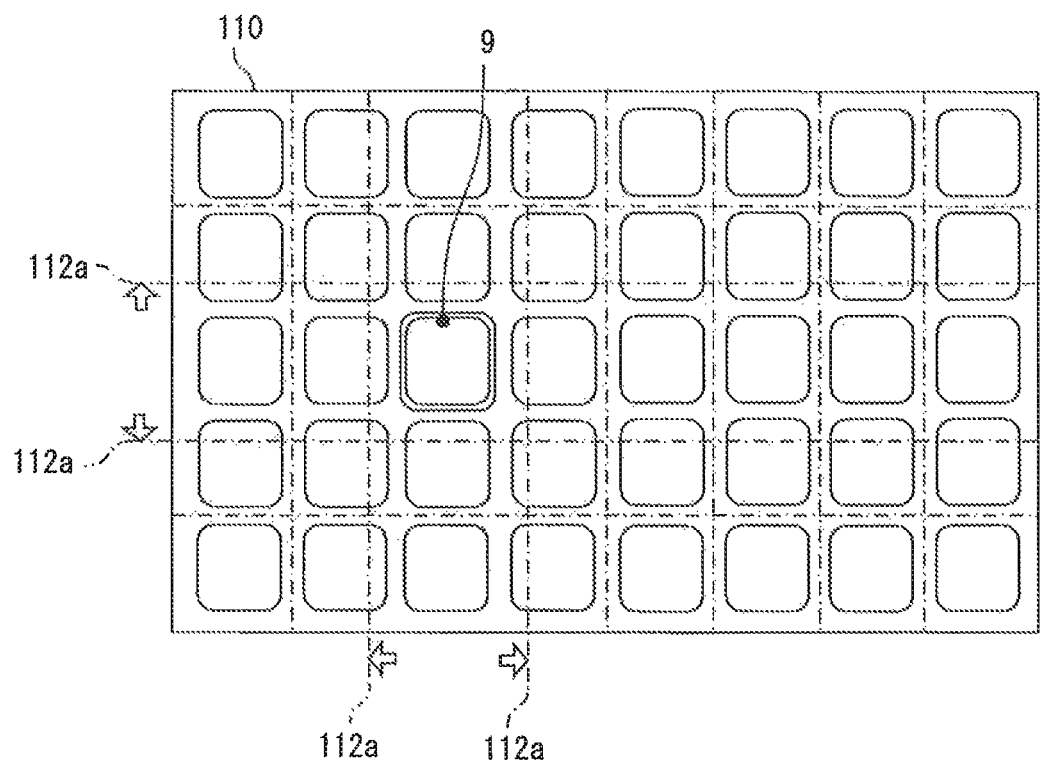
FIG. 3 is a diagram for explaining a modification of the first embodiment.

FIG. 3 illustrates a modification of the first embodiment. The above first embodiment explained that the main movement direction of the pointer 113 is only the lateral direction. However, the main movement direction may be both the lateral direction and the longitudinal direction. For example, when the button 9 is selected, the control portion 130 specifies enlarged boundary lines 112a for the selection region of the button 9 to extend it in both the lateral direction and the longitudinal direction, as illustrated by white arrows in FIG. 3.

The pointer 113 may be moved from the button 9 either in the lateral direction or in the longitudinal direction. The above configuration of the modification of the first embodiment is enabled to certainly select and further determine a button contained in the lateral button row containing the button 9 or in the longitudinal button row containing the button 9.

(Second Embodiment)

A second embodiment of the present disclosure will be explained with reference to FIG. 4. According to the second embodiment, the control portion 130 specifies the magnitude of the enlargement for the selection region based on the magnitude of the vector component pertinent to or along the main movement direction with respect to a vector of a movement when the pointer 113 is moved from an arbitrary button. Herein, as the magnitude of the vector component along the main movement direction is greater, the magnitude of the enlargement for the selection region is specified as being greater.

In the present embodiment, the main movement direction is defined as the lateral direction like in the above first embodiment. The control portion 130 recognizes the magnitude of the movement after the pointer 113 departs from an arbitrary button (i.e., any one of buttons 1 to 6 in FIG. 4) and then exceeds a boundary line 112 in between mutually adjoining lateral button rows. The magnitude of the movement of the pointer 113 can be recognized using a movement vector of the pointer 113 in the coordinates of the display portion 120, for example. In this case, as the x component (lateral direction component) in the movement vector is greater than the y component (longitudinal direction component), the magnitude of the movement in the lateral direction of the pointer 113 is greater than that in the longitudinal direction. Herein, whether the x component is greater than the y component in the movement vector may be determined using the gradient of the movement vector, the difference of the x component and the y component in the movement vector, or the ratio of the x component to the y component in the movement vector.

Figure 4:
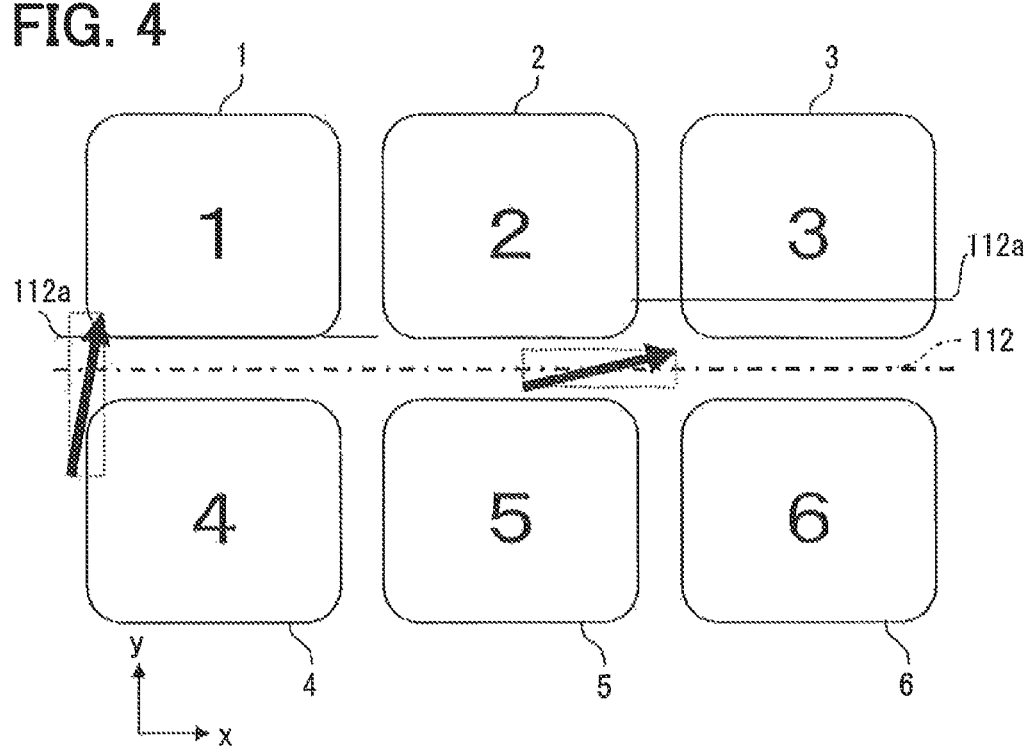
FIG. 4 is a diagram for explaining a second embodiment of the present disclosure.

FIG. 4 illustrates a case that the pointer 113 moves beyond the boundary line 112 from the button row of the buttons 4 to 6 into the button row of the buttons 1 to 3. As the magnitude of the movement in the lateral direction (i.e., x direction) of the pointer 113 is greater, the position of the enlarged boundary line 112a pertinent to the button row of the buttons 4 to 6 is specified to be further towards and into the button row of the buttons 1 to 3, specifying the selection region as being larger.

When the pointer 113 is moved greater or further in the lateral direction and the magnitude of movement of the pointer 113 is greater, the user is estimated to mainly move the pointer 113 in the lateral direction for looking for a next button. According to the present embodiment, the enlarged selection region is provided for the lateral button row when the pointer 113 is moved mainly in the lateral direction, for instance. Thus, even if a misalignment in the longitudinal direction directing at the next lateral button row of the buttons 1 to 3 occurs in the movement of the pointer 113, such a misalignment by the pointer 113 may be absorbed, effectively suppressing an occurrence of an erroneous selection of an unintended button.

On the contrary, as the magnitude of the movement of the pointer 113 in the longitudinal direction (i.e., y direction) directing at the next button row is greater, the position of the enlarged boundary line 112a is specified as being separate from but still near the original boundary line 112, not intending to specify the enlarged selection region as being much greater. Therefore, a prompt selection of a button is enabled for the movement of the pointer 113 in the longitudinal direction directing at the next button row. This enhances the manipulability.

(Third Embodiment)

The present input apparatus according to the first and second embodiments may be used in a vehicle. In this case, the control portion 130 may specify the magnitude of the enlargement of the selection region much greater as the velocity or the vibration quantity of the vehicle is greater.

When the input apparatus 100 is mounted in the vehicle, a misalignment at the movement of the pointer 113 arises more significantly due to the vibration caused during the travel of the vehicle. Therefore, as the velocity or vibration quantity is greater, the magnitude of the enlargement for the selection region may be specified as being greater. Thus, the misalignment by the pointer 113 may be absorbed, helping prevent an occurrence of an erroneous selection of an unintended button.

(Fourth Embodiment)

A fourth embodiment of the present disclosure will be explained with reference to FIG. 5. The fourth embodiment has the following feature as compared with the modification of the first embodiment. That is, when a subject button is selected, the control portion 130 specifies an enlarged selection region for the subject button by adding an enlarged portion, and simultaneously specifies the positions of the selection regions of other buttons other than the subject button as being shifted based on the enlarged portion of the enlarged selection region of the subject button.

In the present embodiment, the main movement direction is defined as both the lateral direction and the longitudinal direction like in the above modification of the first embodiment. For instance, see reference to FIG. 5 that illustrates that the button 9 is selected and the control portion 130 specifies the enlarged boundary lines 112a as shown by white arrows to enlarge the section region of the button 9 in both the lateral direction and the longitudinal direction.

In the modification of the first embodiment, as illustrated in FIG. 3, the next lateral button row and the next longitudinal button row need to reduce the selection regions by an enlarged portion of the enlarged selection region of the subject button 9. Thus, when the pointer 113 is moved from the subject button 9 into either the next longitudinal button row or the next lateral button row, the selection of a button belonging to the next button row becomes more difficult.

Figure 5:
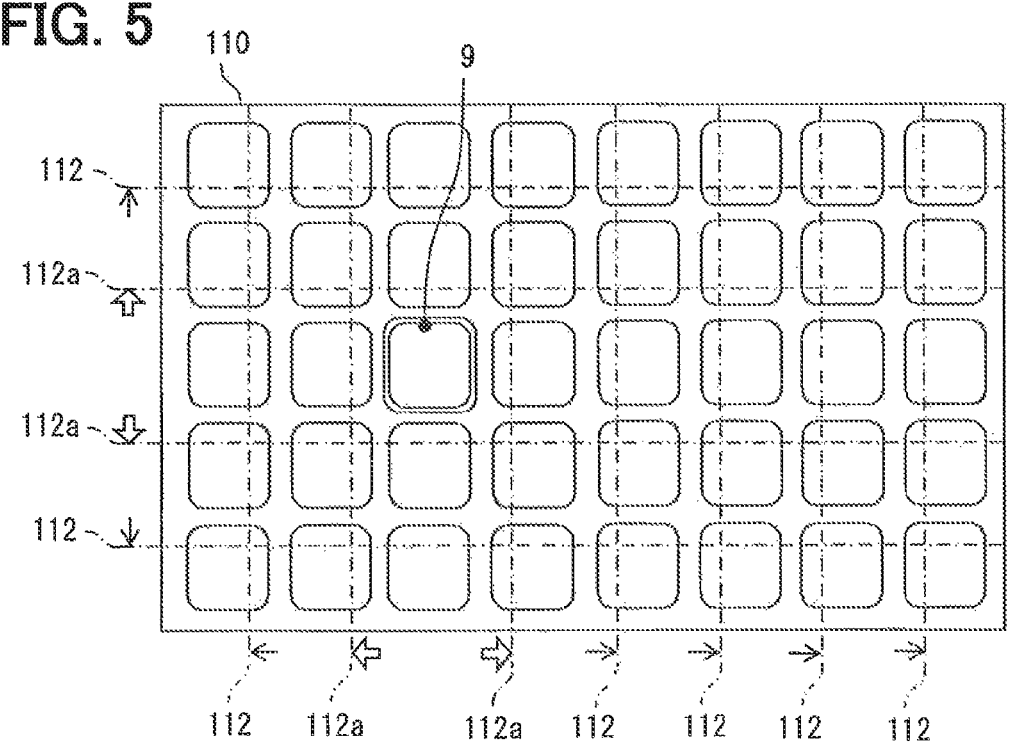
FIG. 5 is a diagram for explaining a fourth embodiment of the present disclosure.

To that end, in the present embodiment, the control portion 130 specifies the positions of the selection regions of the other buttons other than the subject button 9 as being shifted in order in the longitudinal direction and the lateral direction with the same magnitude maintained by the enlarged portion of the selection region of the button 9, as illustrated in FIG. 5. It is noted that the positions of the boundary lines 112 corresponding to the outer peripheral frame of the screen of the display portion 110 are maintained unchanged from the viewpoints below. That is, if the pointer 113 is moved to the outer peripheral frame of the screen, the button corresponding to that position can be certainly selected.

Subsequently, each time the pointer 113 is moved between the buttons, the control portion 130 specifies an enlarged selection region for a selected button while shifting selection regions of the other buttons or the other button rows.

Under the above configuration, the selection regions of the other buttons or the other button rows may be shifted by the enlarged portion of the enlarged selection region that are enlarged both in the lateral direction and in the longitudinal direction on a basis of a selected button. This enables the other buttons belonging to the other button rows to maintain the magnitude of their selection regions unchanged, thereby suppressing the selection of other buttons in the other button rows from becoming difficult.

(Fifth Embodiment)

Figure 6:
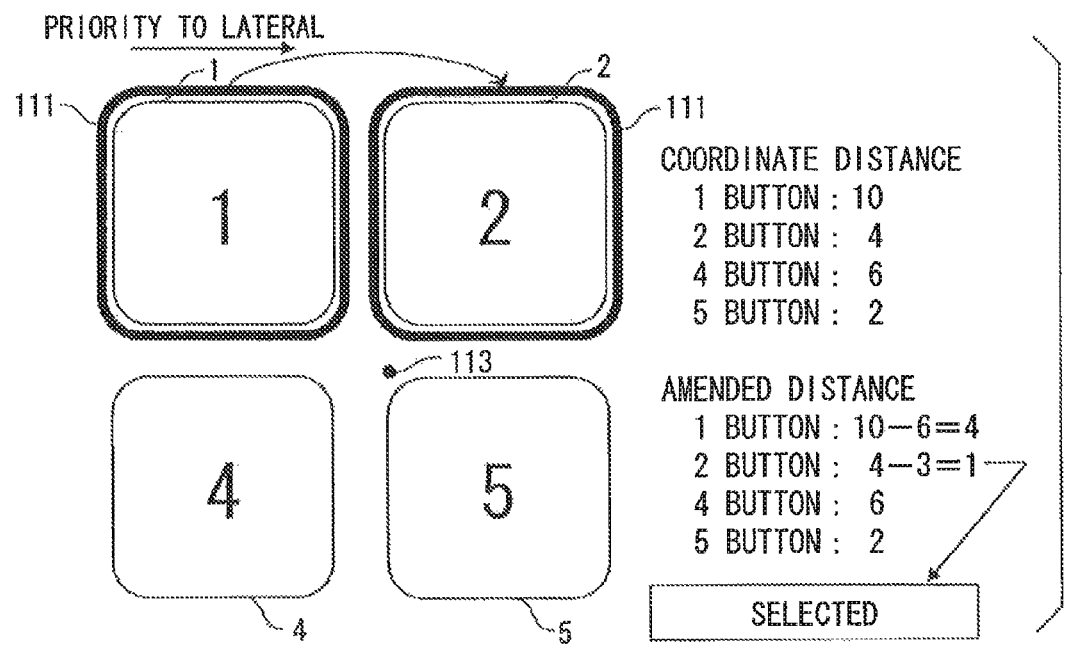
FIG. 6 is a diagram for explaining a fifth embodiment of the present disclosure.

A fifth embodiment of the present disclosure will be explained with reference to FIG. 6. The fifth embodiment is modified from the above first embodiment in that the control portion 130 selects a next button based on a distance between each button and the pointer 113.

In the present embodiment, the main movement direction is defined as the lateral direction like in the above first embodiment, for instance. When the pointer 113 comes out of an arbitrary button (e.g., button 1) that was previously selected as a present selected button, the control portion 13 calculates a distance between the pointer 113 that has come out of the arbitrary button and each of buttons neighboring the pointer. This distance may be referred to as an actual distance or a coordinate distance. As illustrated in FIG. 6, the control portion 113 calculates a coordinate distance of the pointer 113 with each of neighboring buttons 1, 2, 4, and 5 to be "10", "4", "6", and "2", respectively, as illustrated in FIG. 6. The calculated coordinate distance may be a distance of the pointer 113 with, of each button 1, 2, 3, 4, a corner portion nearest to the pointer 113; a shortest distance of the pointer 113 with each button 1, 2, 4, 5; or a distance of the pointer 113 with a center position of each button 1, 2, 4, 5. In the present embodiment, the calculated coordinate distance is a distance with, of each button, a corner portion nearest to the pointer 113, for instance.

Next, the control portion 130 performs a predetermined amendment to the coordinate distance calculated as mentioned above. The predetermined amendment applies to the calculated coordinate distance pertinent to a button (i.e., buttons 1, 2) located within the main movement direction from the present selected button (i.e., button 1). Herein, the main movement direction is the lateral direction as mentioned above. The predetermined amendment is to subtract a predetermined value from the calculated coordinate distance. For instance, the predetermined value for the button 1 serving as the present selected button is six; thus, six is subtracted from the calculated coordinate distance of ten (10). Further, the predetermined value for the button 2 is three; thus, three is subtracted from the calculated coordinate distance of four (4). Therefore, the amended distances after the amendment are four and one for the button 1 and the button 2, respectively.

The control portion 130 then selects as a next selected button a button having a shortest distance among the first calculated coordinate distances (six, two) for the buttons 4, 5, and the amended distances (four, one). In this case, the button 2 having the shortest distance of one (1) is selected as the next selected button.

In the present embodiment, the coordinate distance with the pointer 113 is amended for the buttons contained in the button row in the main movement direction of the present selected button so as to acquire an amended distance that is shorter than the actually calculated coordinate distance. The selection of the button having the shortest distance among the coordinate distances and the amended distances gives a priority to the selection of buttons within the button row in the main movement direction to which the present selected button belongs.

When the pointer 113 deviates from the selection region of the arbitrary button, it is expected that the movement of the pointer 113 has a tendency to direct at the button row in the main movement direction where the arbitrary button belongs. Thus, the priority for the selection of a next selected button is given to buttons of the button row in the main movement direction where the arbitrary button belongs. This configuration facilitates the selection or the determination of the selection for buttons of the button row in the main movement direction where the arbitrary button belongs, thereby suppressing an erroneous selection or erroneous input.

In the present embodiment, the amended distance is obtained by subtracting a predetermined value from the first calculated coordinate distance pertinent to buttons of the button row in the main movement direction to which the first selected arbitrary button (i.e., the present selected button) belongs. There is no need to be limited thereto. Alternatively, another amendment may be made to add a predetermined value to a button of a button row different from the button row in the main movement direction to which the first selected arbitrary button belongs. This relatively shortens the distances of the buttons of the button row in the main movement direction to which the first selected arbitrary button belongs, similarly.

Thus, the control portion 130 may function as a function item selection section to calculate coordinate distances and an amended distance when the pointer 113 is moved from a selection region of a first function item that is selected as a present selected function item. The coordinate distances are calculated between the pointer 113 and each of neighboring function items contained in the first row and a second row that is next to the first row. The amended distance is calculated that is obtained by subtracting by a predetermined amendment quantity from only the coordinate distances between the pointer 113 and each of the neighboring function items contained in the first row. The function item selection section further selects as a next selected function item a function item that has a shortest distance among the coordinate distances and the amended distances.

(Modification of Fifth Embodiment)

Figure 7:
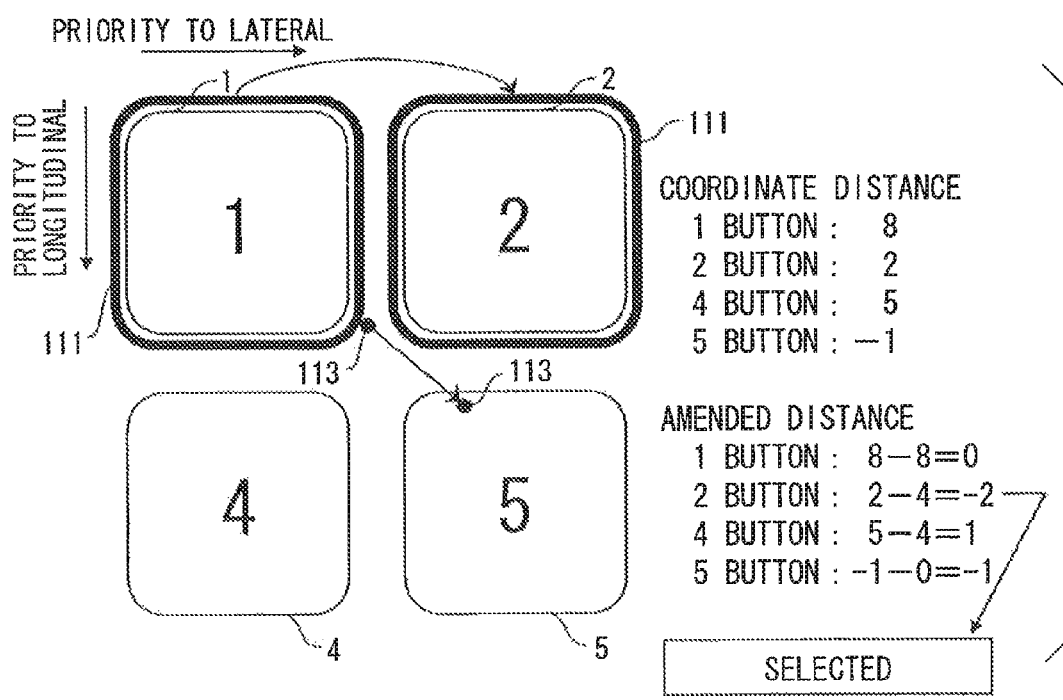
FIG. 7 is a diagram for explaining a modification of the fifth embodiment.

A modification of the fifth embodiment will be explained with reference to FIG. 7. The modification of the fifth embodiment is modified from the above fifth embodiment in that the main movement direction of the pointer 113 is premised to include both the lateral direction and the longitudinal direction so that the control portion 130 selects a next button based on a distance between each button and the pointer 113.

When the pointer 113 is moved outside of an arbitrary button (e.g., button 1) that was selected as a present selected button, the control portion 13 calculates a distance between the pointer 113, which is located in a moved position, and each of buttons neighboring the pointer or the moved position. Herein, the moved position of the pointer 113 is at an upper left corner of the region of the button 5, for example. With reference to FIG. 7, the control portion 130 calculates a coordinate distance with each of the neighboring buttons 1, 2, 4, 5 as "8", "2", "5", "−1", respectively, as illustrated in FIG. 7. Since the pointer 113 is in the region of the button 5, the distance between the pointer 113 and the button 5 is less than zero (minus). The calculation method of the coordinate distance is the same as that of the above fifth embodiment.

Next, the control portion 130 performs a predetermined amendment to the coordinate distance calculated as mentioned above. The predetermined amendment applies to the coordinate distance pertinent to a button (i.e., buttons 1, 2, 4) located within the main movement direction from the first selected arbitrary button (i.e., button 1) so that a predetermined value is subtracted from the coordinate distance with respect to each of the buttons. Herein, the main movement distance is both the lateral direction and the longitudinal direction as mentioned above. For instance, the first predetermined value for the button 1 as the present selected button is eight; thus, eight is subtracted from the coordinate distance of eight (8). Further, the second predetermined value for each of the buttons 2, 4 is four; thus, four is subtracted from each of the coordinate distances of two (2), five (5). Therefore, the amended distances after the amendment are zero (0), minus two (−2), and one (1) for the button 1, the button 2, and the button 4, respectively.

The control portion 130 then selects as a next selected button a button having a shortest distance among the coordinate distance (minus one (−1)) for the button 5, and the amended distances (zero (0), minus two (−2), and one (1)) for the buttons 1, 2, 4. In this case, the button 2 having the shortest distance of minus two (−2) is selected as the next selected button.

Thus, even when more than one main movement direction is premised, a button which should be selected next can be determined easily, like in the fifth embodiment. This enables the selection of the button in consideration of more than one movement direction of the pointer 113.

In the fifth embodiment and the modification of the fifth embodiment, the control portion 130 may specify an amendment quantity when calculating an amended distance, according to the movement direction of the pointer 113. For instance, the control portion 130 specifies an amendment quantity as being greater as the movement direction of the pointer 113 accords with the main movement direction more greatly, i.e., as the degree of a parallel between the movement direction of the pointer and the main movement direction is greater.

This configuration enables the next selection of a button while considering the movement direction of the pointer 113. That is, as the movement direction of the pointer 113 approaches the state to be parallel with the main movement direction closer, the button along the main movement direction can be easily selected as a next selected button.

In the fifth embodiment and the modification of the fifth embodiment, the input apparatus may be mounted in a vehicle, as explained in the third embodiment. In this case, the control portion 130 may specify the amendment quantity at the time of calculating an amended distance much greater as the velocity or the vibration quantity of the vehicle is greater.

When the input apparatus is mounted in a vehicle, the vibration during driving of the vehicle may cause a misalignment of the pointer 113. Even if the vibration causes a misalignment of the pointer 113, the selection of the button within the button row along the main movement direction becomes easy.

Further, in the fifth embodiment and the modification of the fifth embodiment, the main movement direction is assigned to only the lateral direction or both the lateral direction and the longitudinal direction. Alternatively, the main movement direction may be assigned to an oblique direction. That is, the main movement direction may be assigned to at least one of the lateral direction, the longitudinal direction, and the oblique direction.

(Other Embodiment)

The display portion 110 may be defined to display images on the screen such as function items, buttons, icons, or selection regions by using pixels or on a basis of pixels in the whole of the screen. Thus, any region that is displayed in the screen is defined as a region of pixels. In contrast, the control portion 130 controls the display of an image or a region in the screen by controlling the corresponding region of pixels or a pixel region in the screen based on an input value from the input portion 120 that serves as a manipulation portion to point out a pixel in the screen according to a manipulation of a user. The control portion 130 may provide a selectable pixel region to each of buttons. When the manipulation portion points out a position within a selectable pixel region of a subject button, the subject button may be in a selectable state. Further, when the manipulation portion points out the position within the selectable pixel region of the subject button, the control portion 130 may function as a selectable pixel region enlargement section to perform an enlargement of the selectable pixel region of the subject button and an enlargement of a selectable pixel region of a button next to the subject button. Yet further, for instance, the display portion 110 may be provided with a touch-sensitive panel in the screen of the display portion 110 that may serve as the manipulation portion.

Furthermore, the control portion 130 may be provided as a display control apparatus to achieve featured configurations of the above embodiments of the present disclosure while cooperating with the display portion 110 and the input portion 120.

Aspects of the disclosure described herein are set out in the following clauses.

According to a first aspect of the present disclosure, an input apparatus is provided to include a display portion, an input portion, and a control portion. The display portion displays a plurality of function items on a screen. The input portion inputs an input value to move a pointer that conducts a movement to move on the screen, performs a selection to select one of a plurality of selection regions that are provided to the plurality of function items, respectively, using the pointer according to a predetermined selection manipulation, and determines the selection according to a predetermined determination manipulation. The control portion controls the movement of the pointer based on the input value from the input portion. Herein, the plurality of function items are arranged to form at least one row in a predetermined row direction. When a first function item of the plurality of function items is selected, the first function item being contained in a first row that is one of the at least one row arranged in the predetermined row direction, the control portion performs an enlargement to enlarge a selection region of the first row containing the first function item in a direction, which is orthogonal to the predetermined row direction and directing outward of the first row.

According to a second aspect of an option for the first aspect, the plurality of function items may be arranged to form, as the at least one row, a plurality of rows that are parallel in the predetermined row direction. When the first function item is selected, the first function item being contained in the first row that is one of the plurality of rows parallel arranged in the predetermined row direction, the control portion may perform the enlargement to enlarge the selection region of the first row containing the first function item in the direction, which is orthogonal to the predetermined row direction and directing outward of the first row at a row next to the first row.

According to a third aspect of an option for the first aspect, the control portion may specify a magnitude of the enlargement of the selection region based on a magnitude of a vector component in the predetermined row direction, the vector component being of a vector that corresponds to a movement of the pointer from the first function item.

This configuration enables the specification of a selection region while considering the movement direction of the pointer.

According to a fourth aspect of an option for the third aspect, the control portion may specify the magnitude of the enlargement of the selection region greater as the magnitude of the vector component in the predetermined row direction is greater.

As the magnitude of the vector component of the pointer in the predetermined row direction is greater, the pointer may be supposed with a higher probability to move along the predetermined row direction to look for a function item that is to be selected next. Therefore, when the painter is moved mainly in the predetermined row direction, the selection region is enlarged greater towards or into the next row. Under this configuration, even if a misalignment or unintended movement of the pointer towards the next row arises significantly, such a misalignment may be absorbable, thus suppressing effectively the erroneous selection of an unintended function item.

According to a fifth aspect of an option for the first aspect, the input apparatus of the firs aspect may be mounted in a vehicle. The control portion may specify the magnitude of the enlargement of the selection region greater as a velocity of the vehicle or a vibrating of the vehicle is greater.

When the input apparatus is mounted in a vehicle, the vibration during driving of the vehicle may cause a misalignment of the pointer. Under the above configuration of the optional aspect, the magnitude of the enlargement of the selection region is set to be greater as the velocity of the vehicle or magnitude of the vibration in the vehicle is greater. Thus, the misalignment may be absorbed, helping prevent an occurrence of an erroneous selection of an unintended function item.

According to a sixth aspect of an option of the first aspect, the control portion may shift a selection region of an other row of the plurality of rows other than the first row by the magnitude of the enlargement of the section region of the first row.

If the selection region of an arbitrary row of function items is enlarged, a selection region of a next row that is next to the arbitrary row may be reduced. In this case, if the pointer is moved from the arbitrary row to the next row, the selection of a function item belonging to the next row becomes difficult.

In contrast, under the above configuration of the optional aspect, the selection regions of other rows of function items other than the first row are shifted by the magnitude of the enlargement of the selection region of the first row. This enables the function items belonging to the other rows to maintain the magnitude of their selection regions unchanged, thereby suppressing the selection of function items in the other rows from becoming difficult.

According to a seventh aspect of the present disclosure, an input apparatus is provided to include a display portion, an input portion, and a control portion. The display portion displays a plurality of function items on a screen. The input portion inputs an input value to move a pointer that conducts a movement of a pointer on the screen, performs a selection to select one of a plurality of selection regions provided to the plurality of function items, respectively, using the pointer according to a predetermined selection manipulation, and determines the selection according to a predetermined determination manipulation. The control portion controls the movement of the pointer based on the input value from the input portion. Herein, the function items are arranged to form a plurality of rows parallel in a predetermined row direction. When the pointer is moved from a selection region of a first function item that is selected as a present selected function item, the control portion calculates coordinate distances between the pointer and each of neighboring function items contained in the first row and a second row that is next to the first row, calculates an amended distance that is obtained by subtracting by a predetermined amendment quantity from only the coordinate distances between the pointer and each of the neighboring function items contained in the first row, and selects as a next selected function item a function item that has a shortest distance among the coordinate distances and the amended distances.

According to an eighth aspect of an option of the seventh aspect, the control portion may predetermine the amendment quantity used in calculating the amended distances, according to a direction of the movement of the pointer.

This configuration enables the next selection of a function item while considering the movement direction of the pointer.

According to a ninth aspect of an option for the eighth aspect, the control portion may predetermine the amendment quantity greater as the direction of the movement of the pointer is more parallel with the predetermined row direction.

This configuration facilitates the next selection of a function item that is located in the predetermined row direction from the present selected function item.

According to a tenth aspect of an option for the seventh aspect, the input apparatus may be mounted in a vehicle. The control portion may predetermine the amendment quantity greater as a velocity of the vehicle or a vibrating of the vehicle is greater.

When the input apparatus is mounted in a vehicle, the vibration during driving of the vehicle may cause a misalignment of the pointer. Under the above configuration of the optional aspect, the amendment quantity used in calculating the amended distance is set to be greater as the velocity of the vehicle or magnitude of the vibration in the vehicle is greater. Thus, even if the vibration causes a misalignment of the pointer, the selection is facilitated with respect to the function items belonging to same the row as the row where the pointer was located before moving, i.e., the function items that are located in the predetermined row direction from the present selected function item.

According to an eleventh aspect of the present disclosure, an input apparatus is provided as follows. The apparatus selects one of a plurality of buttons displayed on a screen provided with a plurality of pixels in a vehicle. The input apparatus includes a manipulation portion and a control portion. The manipulation portion is configured to point out a spot on the screen according to a manipulation of an occupant of the vehicle. The control portion displays the buttons to be arranged in at least one direction of (i) a longitudinal direction and (ii) a lateral direction on the screen and to specify a selectable pixel region provided to each of the buttons. When the manipulation portion points out a selectable pixel region of one of the buttons, the control portion performs an enlargement to enlarge the selectable pixel region of the one of the buttons, and performs an enlargement to enlarge, in an other direction, a selectable pixel region of a next button that is next to the one of the buttons in the at least one direction. Herein, the other direction is an other of the longitudinal direction of the lateral direction other than the at least one direction.

According to a twelfth aspect of the present disclosure, a display control apparatus is provided while cooperating with a display portion displaying a plurality of buttons and an input portion inputting an input value. The display control apparatus includes the following sections. A button display section is included to cause the display portion to display the plurality of buttons as being arranged to form at least one row in a predetermined row direction. A selection region setup section is included to set up a plurality of selection regions that are provided to the plurality of buttons on the display portion, respectively. An input value processing section is included to process the input value inputted by the input portion to identify a pointed point on the display portion. A button identification section is included to identify one of the buttons when the pointed point is located within a selection region of the one of the buttons in the at least one row. A selection region enlargement section is included to enlarge the selection region of the one of the buttons identified by the button identification section, to a direction that is orthogonal to the predetermined row direction. The section region enlargement section further enlarges, in addition to the selection region of the one of the buttons identified by the button identification section, at least one selection region of at least one button that is included in a same row that is same as the at least one row including the one of the buttons identified by the button identification section.

Further, according to other aspects of the present disclosure, display control apparatuses are provided to basically achieve the control portions and part of the input portions in the input apparatuses according to the above first, seventh, and eleventh aspects while each cooperating with the display portion and the input portion.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An input apparatus comprising:
a display portion to display a plurality of function items on a screen;
an input portion to
input an input value to move a pointer that conducts a movement of a pointer on the screen,
perform a selection to select one of a plurality of selection regions provided to the plurality of function items, respectively, using the pointer according to a predetermined selection manipulation, and
determine the selection according to a predetermined determination manipulation; and
a control portion to control the movement of the pointer based on the input value from the input portion,
wherein:
the function items are arranged to form a plurality of rows parallel in a predetermined row direction; and
when the pointer is moved from a selection region of a first function item that is selected as a present selected function item,
the control portion
calculates coordinate distances between the pointer and each of neighboring function items contained in the first row and a second row that is next to the first row,
calculates an amended distance that is obtained by subtracting by a predetermined amendment quantity from only the coordinate distances between the pointer and each of the neighboring function items contained in the first row, and selects as a next selected function item a function item that has a shortest distance among the coordinate distances and the amended distances.

2. The input apparatus according to claim 1, wherein:
the control portion predetermines the amendment quantity used in calculating the amended distances, according to a direction of the movement of the pointer.

3. The input apparatus according to claim 2, wherein:
the control portion predetermines the amendment quantity greater as the direction of the movement of the pointer is more parallel with the predetermined row direction.

4. The input apparatus according to claim 1, wherein:
the input apparatus is mounted in a vehicle; and
the control portion predetermines the amendment quantity greater as a velocity of the vehicle or a vibrating of the vehicle is greater.

5. A display control apparatus cooperating with a display portion and an input portion, the display portion displaying a plurality of function items on a screen, the input portion inputting an input value,
the display control apparatus comprising:
a function item display section to cause the display portion to display the plurality of function items on the screen as being arranged to form a plurality of rows parallel in a predetermined row direction;
a selection region setup section to set up a plurality of selection regions that are provided to the plurality of function items on the screen of the display portion, respectively;
an input value processing section to process the input value inputted by the input portion to move a pointer that conducts a movement to move on the screen;
a selection section to select one of the plurality of selection regions that are provided to the plurality of function items, respectively, based on the movement of the pointer; and
a function item selection section to calculate coordinate distances and an amended distance when the pointer is moved from a selection region of a first function item that is selected as a present selected function item,
the coordinate distances being calculated between the pointer and each of neighboring function items contained in the first row and a second row that is next to the first row,
the amended distance being calculated that is obtained by subtracting by a predetermined amendment quantity from only the coordinate distances between the pointer and each of the neighboring function items contained in the first row,
the function item selection section further selecting as a next selected function item a function item that has a shortest distance among the coordinate distances and the amended distances.

* * * * *